May 8, 1962 H. W. ASCHINGER 3,033,149
UNDERWATER FASTENING DEVICE
Filed Aug. 12, 1959
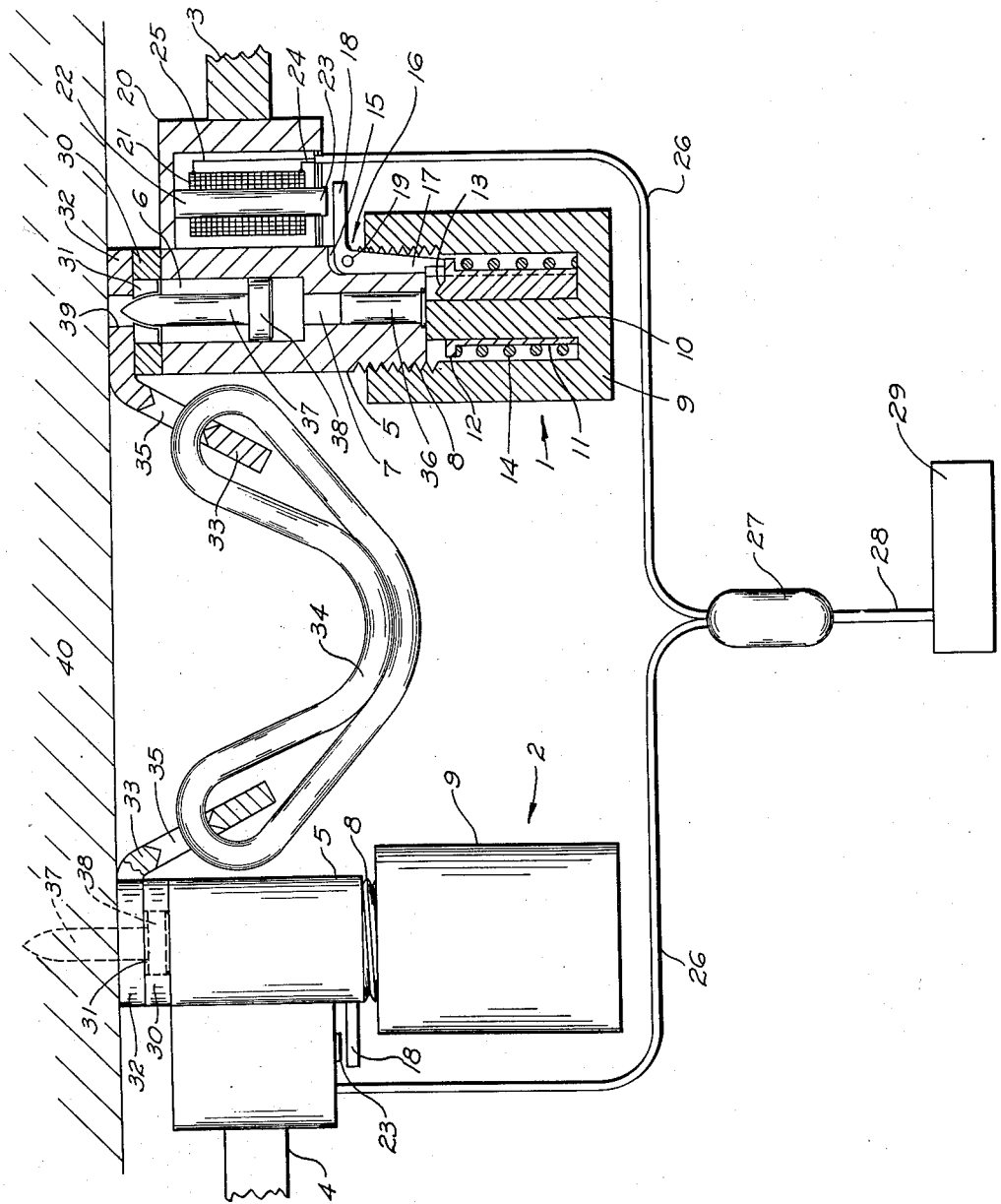
INVENTOR.
Harold W. Aschinger
BY United States Patent Office 3,033,149
Patented May 8, 1962

3,033,149
UNDERWATER FASTENING DEVICE
Harold W. Aschinger, Ridgefield, N.J., assignor, by mesne assignments, to Vare Industries, Roselle, N.J., a corporation of New Jersey
Filed Aug. 12, 1959, Ser. No. 833,275
2 Claims. (Cl. 114—51)

The present invention deals with an underwater fastening device and more particularly with a device for securing fasteners to the wall of an immersed object.

It is an object of the invention to provide a remotely controlled fastening device for securing fastening means to the wall of an immersed or sunken object and whereby the object is lifted.

It is another object of the invention to provide a remotely controlled means for securing fasteners to the walls of sunken objects located at great depths.

Other objects and advantages of the invention will become apparent from the description hereinafter following and the drawing forming a part hereof, in which the illustration shows a partly cross-sectional and partly elevational view of an underwater fastening device according to the invention.

The device of the invention is especially applicable as a mounting on a remotely controlled underwater vehicle, whereby the vehicle is operated from a surfaced vessel and is capable of contacting the sunken object with the fastening device.

Regarding the illustration, the invention comprises at least one fastening device 1 and 2 mounted on an underwater vehicle (not shown) by means of arms 3 and 4. Each device is identical to the other and comprises a tube or tubular member 5 having its inner surface in the form of a projectile bore 6 and communicating therewith a breech bore 7 of less diameter than the projectile bore, the combined bores being coextensive with the tube length. One end of the tube 5 is threaded partly along its length adjacent the breech bore, as at 8. A cylindrical cap 9 is threaded over the threads 8. The cap 9 comprises an inner axial cylindrical lug 10 projecting from the inner bottom surface of the cap and having mounted thereon an axially slidable sleeve 11. The sleeve 11 is provided with a terminal flange 12 having a firing point 13 projecting therefrom axially of the sleeve. The sleeve 11 is spring-loaded by means of helical spring 14 mounted on the outer surface of the sleeve in abutment with the inner bottom surface of the cap and the flange 12.

A slot 15 is cut through the threaded portion 8 of the tube 5 longitudinally of the tube 5 and partly through the thickness thereof. An L-shaped trigger or lever 16 having a vertical leg 17 and horizontal leg 18 is mounted on the tube 5 with the vertical leg 17 pivotally mounted in the slot 15 by means of pivot pin 19 bridging the slot and positioned at the joint area of legs 17 and 18, whereby the leg 18 extends horizontally outward of the slot.

A housing 20 is mounted on the tube 5 and contains an electromagnet 21 with its core 22 having an end 23 spaced from the lever leg 18 at a distance within the magnetic field of the core end 22. The electromagnet is energized by means of input leads 24 and 25 within a cable 26 secured to the housing 20. Each cable 26 is connected through a junction means 27 to a cable 28 leading to a switch housing 29, whereby a plurality of devices 1 and 2 are simultaneously activated.

The free end of tube 5 is provided with a centrally apertured permanently magnetic chuck 30 fixed to the end of the tube and with a readily deformable or yieldable ring 31 within the chuck aperture.

An apertured metal collar 32, having an arm 33 extending therefrom, is coaxially mounted on the magnetic ring or chuck 30 and is magnetically retained thereon. A lifting bridle 34 is connected to the arms 33 through apertures 35 in the arms and interconnects the fastening devices 1 and 2, whereby a cable (not shown) is connected to the bridle 34 for lifting purposes.

Prior to operation, a cartridge 36 is mounted in the breech bore 7 and a projectile 37 having an enlarged head 38 is positioned in the projectile bore. Since the head 38 contacts the bore 6, a yieldable ring 31, e.g. a plastic ring, is used to align the tip of the projectile and to guide the projectile body through the aperture 39 of the collar 32.

In operation, an underwater vehicle, on which the fastening device is mounted, is maneuvered so that the collar 32 of the invention is moved into contact with the sunken object. The switch 29 is operated to energize the device, whereby the electromagnet 21 causes the armature arm 23 of the lever 16 to pivot on pivot 19 to disengage the arm 17 from the sleeve flange 12, whereby the spring 14 urges the firing pin 13 to detonate the cartridge 36. The detonated cartridge causes the projectile 37 to pass into the guide ring 31, the collar aperture 39, and into the wall 40, with the projectile head securing the collar 32 to the wall 40. After firing the cartridge 36, or simultaneously firing a plurality of identical cartridges in a plurality of devices 1 and 2, the underwater vehicle is moved away from the sunken object and the magnetic chucks 30 break away from the collars 32 leaving the collars effectively fastened to the wall 40 and with a hoist cable (not shown) secured to the bridle 34 for lifting the object.

Various modifications of the invention are contemplated within the scope of the appended claims.

What is claimed is:

1. An underwater fastening means comprising a plurality of laterally spaced fastening devices, each device comprising a tube, breech means at one end of the tube, a cap member capping said end, a co-axial magnetic ring mounted on the other end of the tube, axially movable firing pin means mounted within said cap, electromagnetic trigger means mounted on said tube and engageable with said firing pin means, a metal collar co-axial with and magnetically coupled to said magnetic ring, and a bridle bridging the metal collars.

2. An underwater fastening means according to claim 1, comprising input conductors leading to each of the electromagnetic trigger means.

References Cited in the file of this patent
UNITED STATES PATENTS

| 1,388,363 | Miller | Aug. 23, 1921 |
| 1,393,894 | McGill | Oct. 18, 1921 |
| 2,037,129 | Hilts | Apr. 14, 1936 |